United States Patent [19]

Ferrando et al.

[11] Patent Number: 5,326,079
[45] Date of Patent: Jul. 5, 1994

[54] SELF-SEALING VALVE BODY AND ORIFICE MEMBER ASSEMBLY

[76] Inventors: Robert F. Ferrando, 7 Hillock Dr., Wallingford, Conn. 06492; Frank A. Molgano, III, 489 Wolcott Rd., Unit 95, Bristold, Conn. 06010; Dennis Mudge, C-501, 300 Gold Spring Rd., Rocky Hill, Conn. 06067; Michael A. Puhalski, 28 Old Village La., Farmington, Conn. 06085

[21] Appl. No.: 107,407

[22] Filed: Aug. 16, 1993

[51] Int. Cl.$^5$ .............................. F16K 27.08
[52] U.S. Cl. ............................ 251/359; 285/382.2
[58] Field of Search .............. 251/359, 367, 362; 137/454.5, 315; 285/382, 382.2

[56] References Cited

U.S. PATENT DOCUMENTS 3,111,961 11/1963 Dudgeon .................... 137/454.5
3,224,799 12/1965 Blose et al. ................. 285/382.2
4,078,574 3/1978 Kosarzecki .................. 137/454.5

Primary Examiner—A. Michael Chambers

[57] ABSTRACT

A valve is provided with an orifice member that is forcibly inserted into an opening of the valve body and the opening in the valve body is provided with a plurality of protrusions, or ribs, which are shaped and sized to deform in a particular manner during the insertion of the orifice member. The protrusions, or ribs, extend radially inward from the inner cylindrical surface of the opening in the valve body. The deformation of the ribs during the insertion of the orifice member provides sealing at the interface between the orifice member and the valve body and, in addition, rigidly holds the orifice member at a predefined position relative to the valve body and permits this position to accurately determined by using a datum surface during the assembly process.

11 Claims, 3 Drawing Sheets

SELF-SEALING VALVE BODY AND ORIFICE MEMBER ASSEMBLY

BACKGROUND OF THE INVENTION

1. Field of the Invention

The present invention is related generally to valves and, more specifically, to a means for assembling an orifice member to a conduit of a valve body in a way which reduces the expense involved in the assembly operation and, in addition, assures the desired dimensional relationship between the orifice member and the valve body.

2. Description of the Prior Art

In many types of valves, such as solenoid valves, it is necessary to provide an accurately dimensioned orifice within the valve structure to accomplish this goal, it is conventional to machine an orifice opening in an orifice member and then attach the orifice member to a conduit within the valve body. To make this attachment in a leak tight manner, those skilled in the art typically provide a press fit between the orifice member and the opening in the valve body. An additional operation is generally required to assure a leak tight seal between these components. This additional operation usually involves some means of staking or sealing the interface between the valve body and the orifice member with a sealant.

It would be beneficial if a means were provided to reduce the cost of the assembly of the orifice member to the valve body and also facilitate the accurate positioning of the orifice member relative to the valve body.

SUMMARY OF THE INVENTION

A preferred embodiment of the present invention provides a first conduit formed in a valve body of a valve, such as a solenoid valve. In addition, an orifice member is disposed within the first conduit and the orifice member is held in position relative to the first conduit by a plurality of protrusions formed on the internal surface of the first conduit. The plurality of protrusions are shaped and sized to be deformed by an outer surface of the orifice member when the orifice member is forcibly inserted into the first conduit. In a most preferred embodiment of the present invention, the protrusions are circular ribs extending inwardly from the inner cylindrical surface of the first conduit. The ribs are specifically formed to provide a sealing function when the orifice member is forced into the first conduit.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
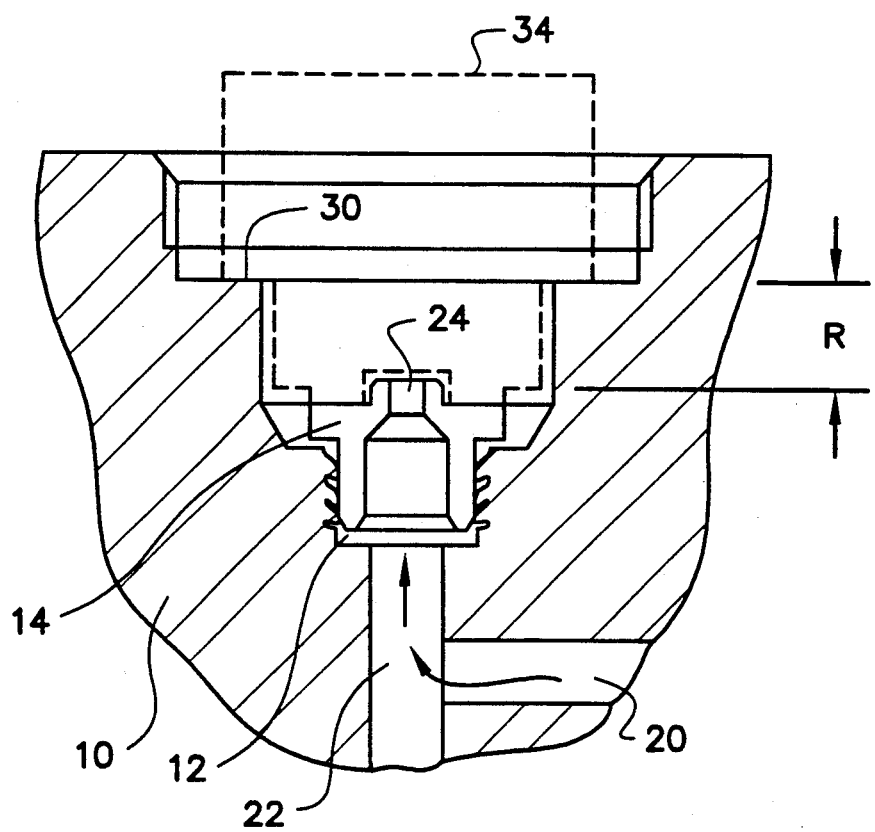
FIG. 1 is a sectional view of a valve made in accordance with the present invention.

Throughout the Description of the Preferred Embodiment, like components will be identified by like reference numerals. FIG. 1 illustrates a sectional view of a portion of a valve, such as a solenoid valve. The valve body 10 is provided with an opening 12 and an orifice member 14 is disposed within the opening 12. In a typical application of this type of orifice structure, other conduits, such as those identified by reference numerals 20 and 22, are provided to direct a fluid toward an orifice opening 24 formed in a portion of the orifice member 14. In applications of this type, the upper portion of the orifice member 14, around the orifice opening 24, usually must be located at a precise position relative to other portions of the valve body in order to assure that a moveable device, such as a solenoid operated plunger, is able to prevent fluid from flowing through the orifice opening 24 when the plunger is forced against the surface at the upper portion of the orifice opening 24. For example, the dimension identified by reference letter R in FIG. 1 is a critical dimension in certain valve constructions and must be accurately maintained during assembly and operation of the valve.

The present invention permits a datum surface 30 to be used as a dimensional reference to accurately locate the orifice member 14 relative to the valve body 10. Dashed line 34 in FIG. 1 schematically illustrates an exemplary tool that could be used to forcibly insert the orifice member 14 into opening 12 and accurately stop the insertion at a predetermined position as illustrated by dimension R. Although dashed line 34 is used to show an exemplary tool for these purposes, it should be clearly understood that many alternative tools could be used to perform this function. A tool of this general type could be used to force the orifice member into opening 12 until the tool moves into contact with surface 30. Since no further staking or sealing operations are required, dimension R will not change.

Figure 2:
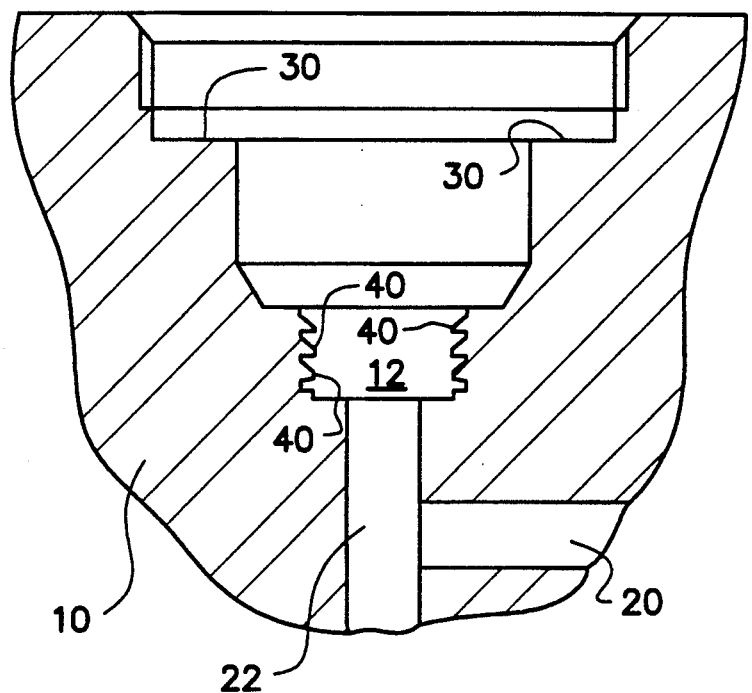
FIG. 2 is a sectional view of a valve body made in accordance with the present invention.

FIG. 2 illustrates the valve body without the orifice member inserted in its opening 12. In FIG. 2, a plurality of protrusions 40 are shown extending from the inner cylindrical surface of opening 12. These protrusions are sized and shaped so that the forcible insertion of the orifice member 14 into opening 12 will deform them in a manner which provides sealing between the outer surface of the orifice member and the inner surface of opening 12. The particular shapes and sizes of the protrusions in a particularly preferred embodiment of the present invention will be described below in conjunction with FIG. 4.

Figure 3:
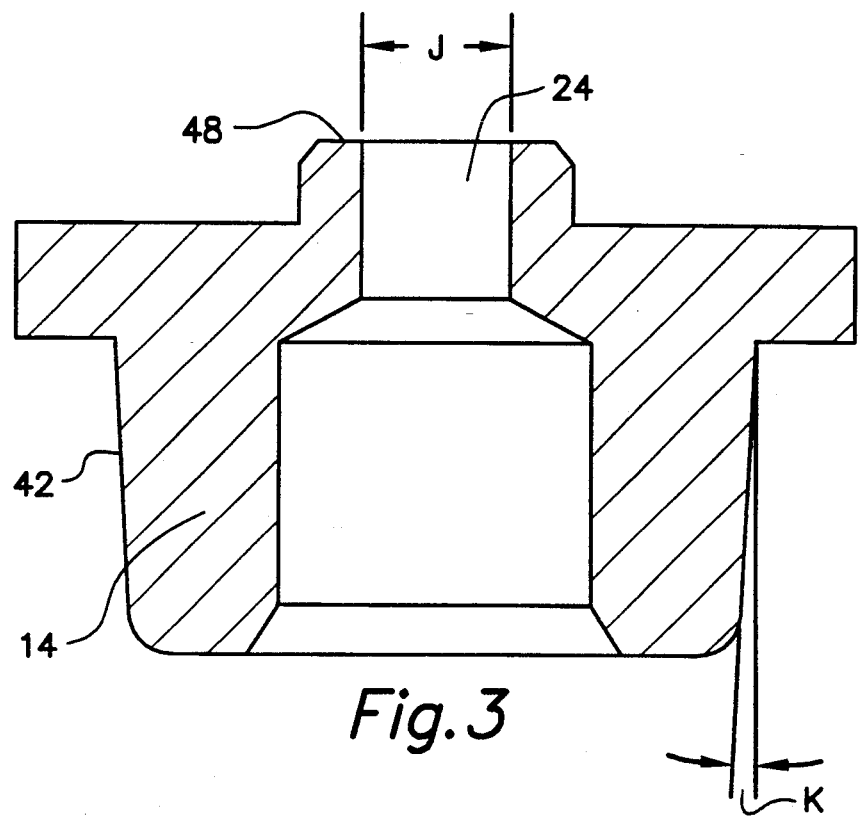
FIG. 3 is a sectional view of an orifice member.

FIG. 3 illustrates a typical orifice member 14. The orifice member comprises an outer generally cylindrical surface 42. In a preferred embodiment of the present invention, surface 42 is slightly tapered as indicated by angle K. In addition, the orifice opening 24 is formed in the orifice member 14 to permit the flow of fluid through the orifice member when no obstruction is placed in contact with the surface 48 surrounding the upper end of the orifice opening 24. Depending on the valve design, dimension J can be many different sizes. For example, solenoid valves are commonly manufactured with dimension J ranging from 0.031" to 0.110".

Figure 4:
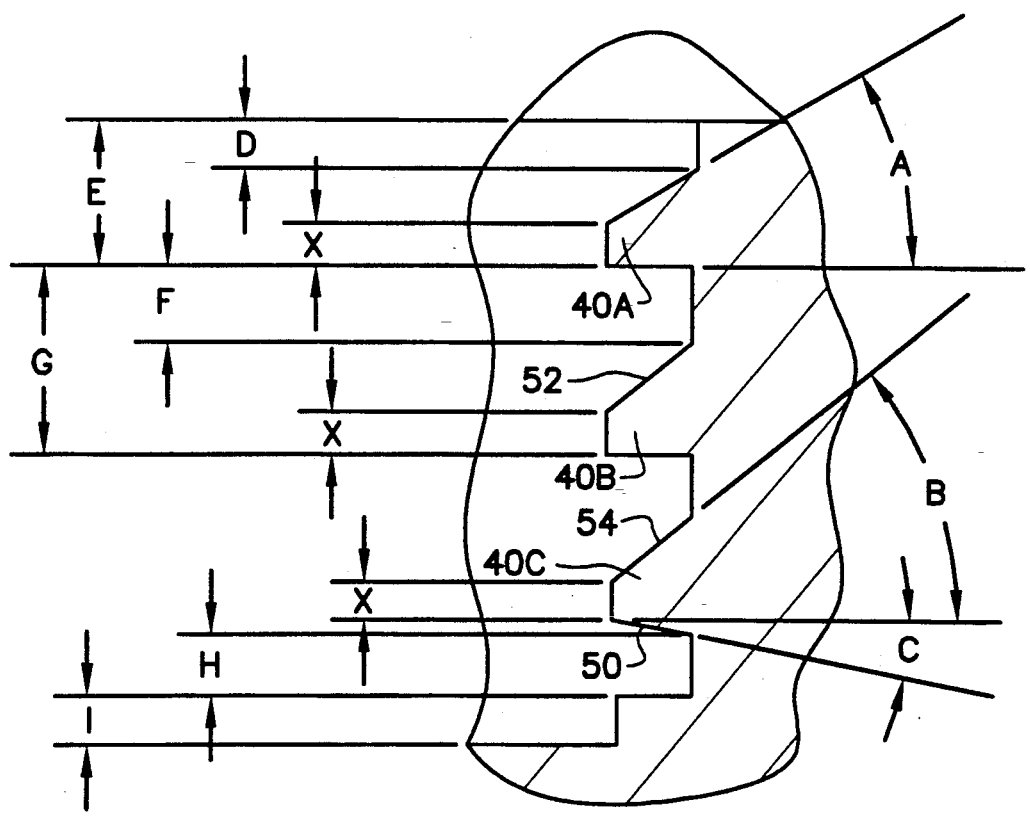
FIG. 4 is a detailed sectional view of protrusions made in accordance with the present invention.

FIG. 4 illustrates exemplary shapes and sizes of the protrusions 40 made in accordance with one particularly preferred embodiment of the present invention. As can be seen in FIG. 4, the three protrusions 40, or ribs, are of different sizes and shapes. The ribs are formed in these sizes and shapes so that they each deform in a generally predictable manner and provide an adequate attachment and seal between the orifice member 14 and the opening 12 in the valve body 10. In the following description of FIG. 4, specific dimensions will be used to particularly describe one preferred embodiment of the present invention. However, it should be understood that some variations of these dimensions are within the scope of the present invention. The upper and lower surfaces of rib 40A are associated at an angle A which is approximately 30 degrees. Although ribs 40A and 40B have lower surfaces that are generally perpendicular to a centerline of opening 12, the lower surface 50 of rib 40C is disposed at an angle C to a plane that is perpendicular to the centerline of opening 12. Angle C, in a preferred embodiment of the present invention, is approximately 20 degrees.

With continued reference to FIG. 4, angle B is approximately 45 degrees. The upper surfaces, 52 and 54, of ribs 40B and 40C both extend at an angle of approximately 45 degrees from a plane perpendicular to the centerline of opening 12. The specific dimensions of the orifice member and ribs shown in FIGS. 3 and 4 are identified in Table I below.

TABLE I

| Reference Letter | Dimension |
| --- | --- |
| A | 30 degrees |
| B | 45 degrees |
| C | 20 degrees |
| D | 0.0130 inches |
| E | 0.0295 inches |
| F | 0.0190 inches |
| G | 0.0440 inches |
| H | 0.0260 inches |
| I | 0.0125 inches |
| K | 34' to 1°9' |

Figure 5:
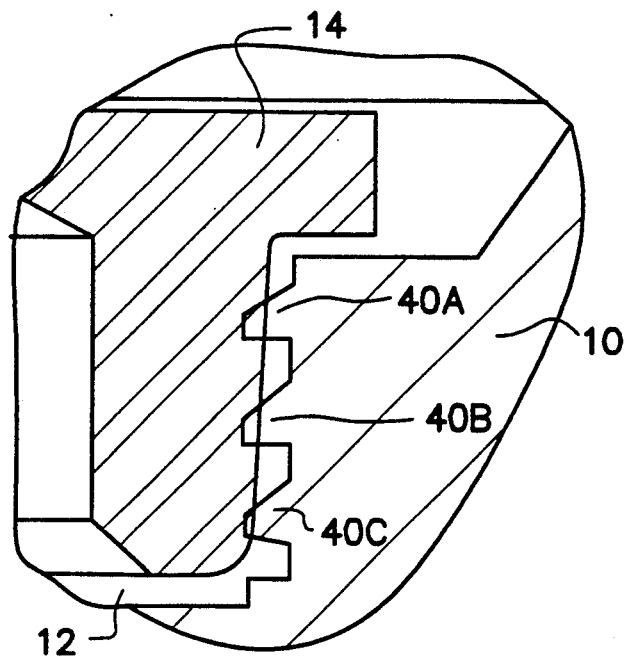
FIG. 5 is a schematic illustration of the relative sizes of an orifice member and the protrusions of the present invention.

FIG. 5 shows the valve body 10 and orifice member 14 assembled together, but with the ribs 40 illustrated in interfering relation with the orifice member. This illustration is provided to illustrate that the relative sizes and shapes of ribs 40A, 40B and 40C provide for a necessary deformation of those ribs when the orifice member 14 is forcibly inserted into opening 12. This deformation is intentional and occurs in a specific manner which results from the particular selection of sizes and angles of the ribs as illustrated in FIG. 4 and described above.

Figure 6:
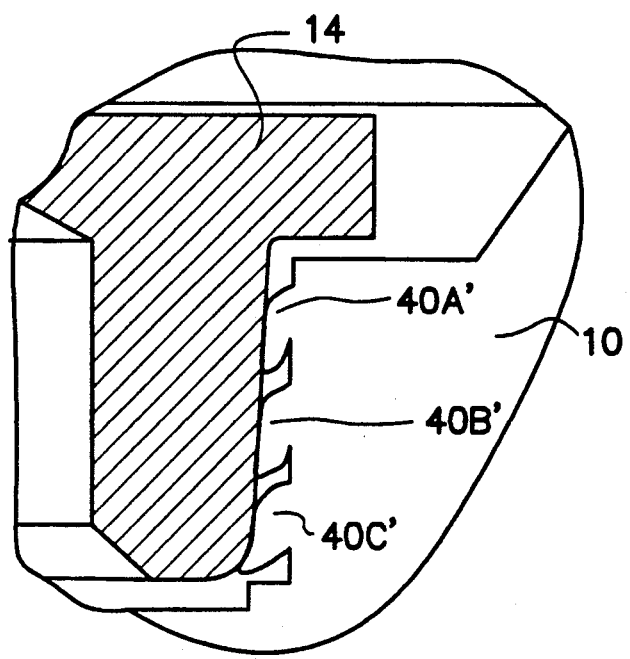
FIG. 6 shows a sectional view of an assembled valve made in accordance with the present invention.

FIG. 6 illustrates the orifice member 14 inserted into opening 12 with the ribs deformed during this insertion. The deformed ribs provide a seal at the innerface between the orifice member 14 and the valve body 12. The deformed ribs are identified in FIG. 6 as 40A', 40B' and 40C'. It should be understood that the illustration in FIG. 6 is an approximate representation and is not intended to be a precise representation of the deformed shapes of the three protrusions. It should also be understood that the specific deformed shapes of the ribs can vary slightly from one application to another. The deformation of the ribs can be affected by slight variations in dimensions, slight variations in the coefficient of friction between the orifice member 14 and the ribs and a slight variation in alignment between the central axis of the orifice member and the central axis of opening 12.

With reference to FIGS. 4 and 6, it can be seen that the bottom portion of rib 40C, which is identified by angle C in FIG. 4, results in a different type of deformation of rib 40C' than the other two ribs. This different type of deformation causes the bottom portion of the deformed rib 40C' to extend radially inwardly toward the center of opening 12 and under a portion of the orifice member 14. This particular type of deformation provides a valuable function for the valve structure during operation. More specifically, a typical solenoid valve operation causes a solenoid driven plunger to repeatedly impact against the surface 48 of the orifice around the orifice opening 24. This repeated pounding against surface 48 could possible cause the orifice member 14 to move further into opening 12 during operation and after assembly. This relative movement between the orifice member 14 and the valve body 10 could result in a degraded sealing capacity at the innerface between these two members and a reduced ability of a plunger to prevent fluid flow through the orifice opening 24. The bottom portion of deformed rib 40C' inhibits this type of movement in response to the repeated impacts on surface 48 of the orifice member 14.

With continued reference to FIGS. 4 and 6, it should be noted that although spaces are illustrated between deformed teeth 40A' and 40B' and between deformed teeth 40B' and 40C', it is not expected that these spaces would occur in every application. The relative dimensions of the rib cross sections in FIG. 4 and the spaces between the ribs are particularly selected to provide sufficient space between the ribs to accept the deformed material that moves into those spaces as a result of the forcible insertion of the orifice member into opening 12.

A valve made in accordance with the present invention as described above utilizes the orifice member having a tapered portion and forcibly inserts the tapered portion of the orifice member into a generally circular opening in the valve body that is provided with a plurality of protrusions, or ribs, extending radially inward from the inner cylindrical surface of the opening. The sizes and shapes of the protrusions, in combination with the size of the orifice member, plastically deform the ribs during the initial insertion operation and then elastically deform the ribs as the insertion is completed. The shapes of the ribs in combination with the tapper on the orifice member assures a press fit over the entire length of engagement between the deformed ribs and the orifice member. As a result, a leak tight seal is achieved without the need for additional staking or the application of a sealant. In addition, the physical attachment between the orifice member and the opening in the valve body is able to withstand the repeated pounding that the orifice member must experience during normal operation of the valve. As described above, another benefit of the present invention is that it provides the ability to press the orifice member into the valve body to a very precise location with respect to a principle datum surface of the valve body. In effect, the orifice member is suspended within the ribs and is not restrained by any immobile surface. Unlike the conventional method of assembling an orifice member into a valve body, the present invention does not press the orifice member into the opening until it comes to rest against an immobile surface. Conventional methods of assembling an orifice member to a valve body, due to tolerance stackup of valve body and orifice member features, are much less precise than that which is provided by the present invention. In summary, the final position of the orifice member in relation to the valve body is determined when the insertion process is halted because the critical location of the orifice member is at a precise dimension relative to a predetermined datum surface in accordance with the present invention rather than when a portion of the orifice member moves into contact with an immobile surface, such as the bottom of the opening into which it is being assembled.

Although the present invention has been described with particular specificity and illustrated to show one particularly preferred embodiment of the present invention, it should be understood that alternative embodiments are within its scope.

The embodiments of the invention in which an exclusive property or right is claimed are defined as follows:

1. A valve, comprising:
   a valve body having a first conduit formed therein; and
   an orifice member disposed within said first conduit, said orifice member being held in position relative to said first conduit by a plurality of protrusions formed on the internal surface of said first conduit, each of said plurality of protrusions extending in a circular configuration around said internal surface of said first conduit, said plurality of protrusions being sized to be deformed by an outer surface of said orifice member when said orifice member is forcibly inserted into said first conduit.

2. The valve of claim 1, wherein:
   said outer surface of said orifice member is tapered.

3. The valve of claim 1, wherein:
   said valve is a solenoid valve.

4. The valve of claim 1, wherein:
   said plurality of protrusions comprises three ribs.

5. The valve of claim 1, wherein:
   said orifice member has a generally smooth outer surface.

6. A valve, comprising:
   a valve body having a first conduit formed therein; and
   an orifice member disposed within said first conduit, an outer surface of said orifice member being generally smooth and tapered, said orifice member being held in position relative to said first conduit by a plurality of protrusions formed on the internal surface of said first conduit, each of said plurality of protrusions extending in a circular configuration around said internal surface of said first conduit, said plurality of protrusions being sized to be deformed by said outer surface of said orifice member when said orifice member is forcibly inserted into said first conduit.

7. The valve of claim 6, wherein:
   said valve is a solenoid valve.

8. The valve of claim 6, wherein:
   said plurality of protrusions comprises three ribs.

9. A valve, comprising:
   a valve body having a first conduit formed therein; and
   an orifice member disposed within said first conduit, an outer surface of said orifice member being generally smooth, said orifice member being held in position relative to said first conduit by a plurality of protrusions formed on the internal surface of said first conduit, each of said plurality of protrusions extending completely around said internal surface of said first conduit to form a generally circular rib, said plurality of protrusions being sized to be deformed by said outer surface of said orifice member when said orifice member is forcibly inserted into said first conduit.

10. The valve of claim 9, wherein:
    said valve is a solenoid valve.

11. The valve of claim 9, wherein:
    said plurality of protrusions comprises three of said ribs.

* * * * *